(No Model.)  3 Sheets—Sheet 1.
E. P. SHETTER.
MEANS FOR SEPARATING WATER AND GAS FROM OIL.
No. 249,487. Patented Nov. 15, 1881.
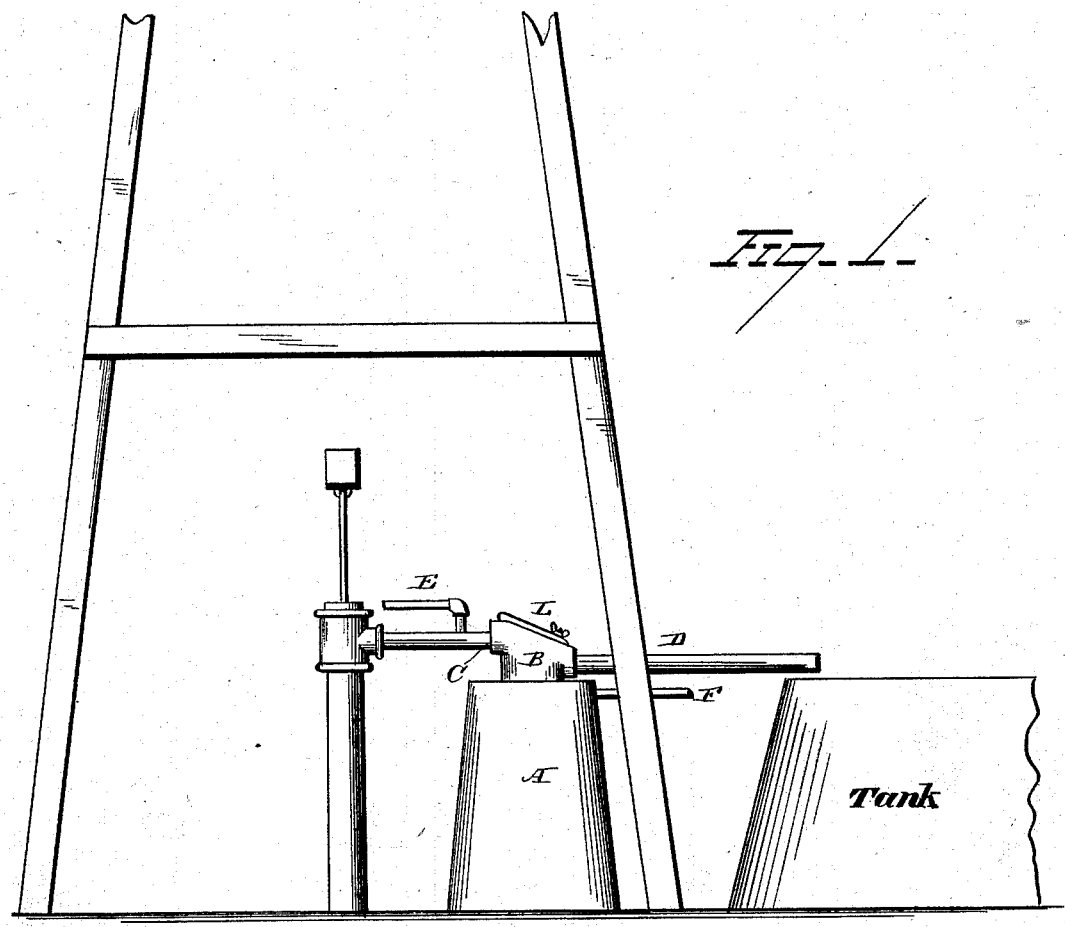

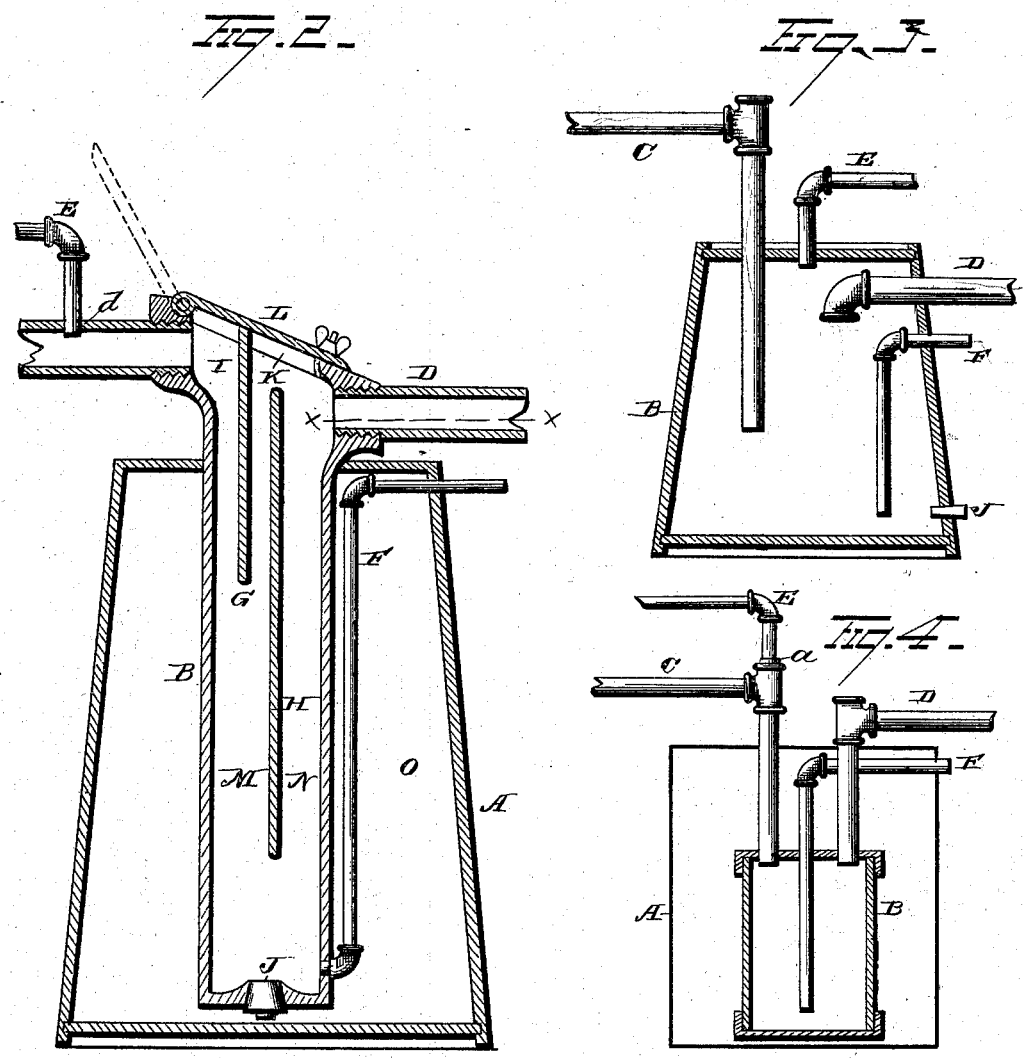

(No Model.) 3 Sheets—Sheet 3.
E. P. SHETTER.
MEANS FOR SEPARATING WATER AND GAS FROM OIL.
No. 249,487. Patented Nov. 15, 1881.
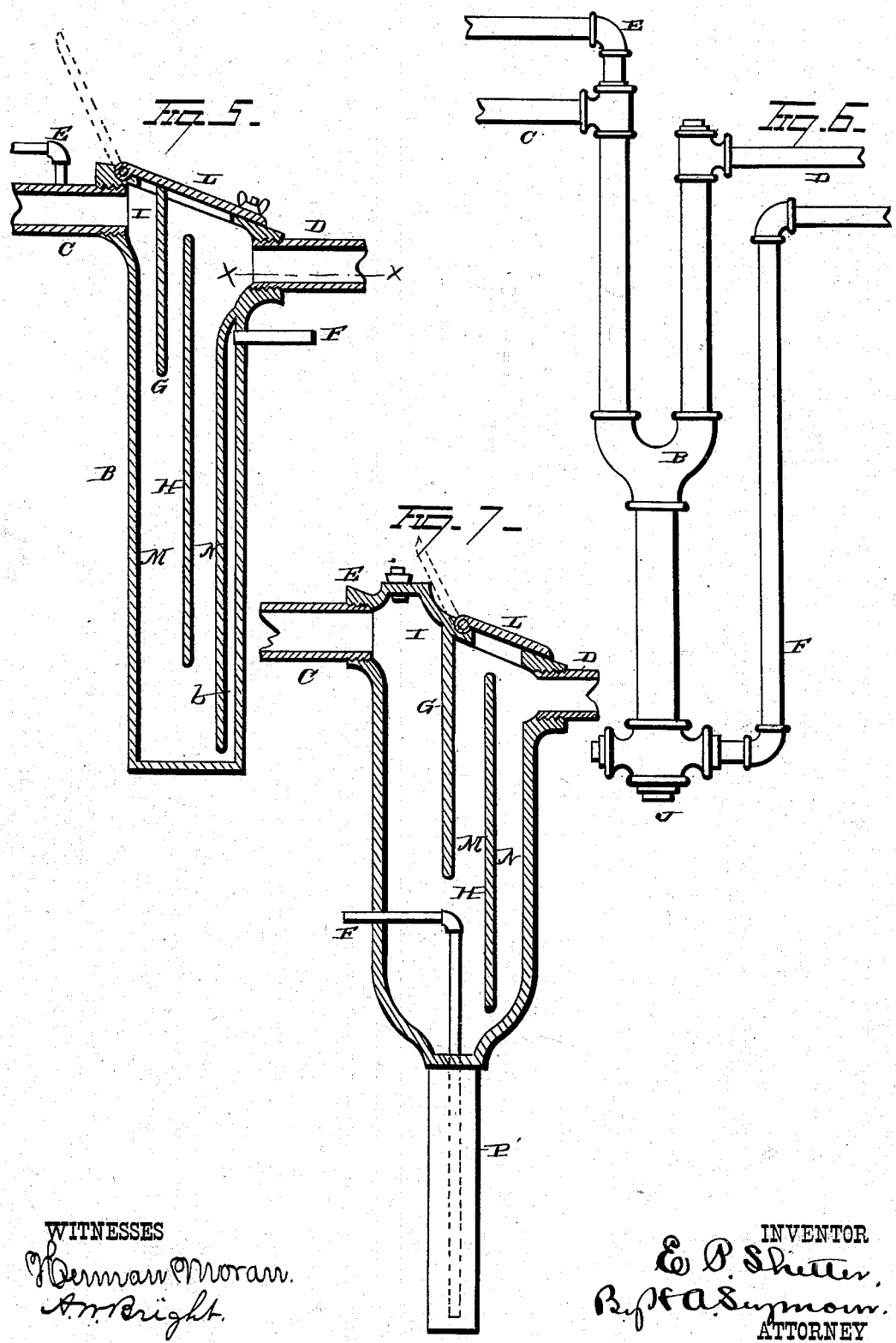

UNITED STATES PATENT OFFICE.

EGBERT P. SHETTER, OF BULLION, PENNSYLVANIA.

MEANS FOR SEPARATING WATER AND GAS FROM OIL.

SPECIFICATION forming part of Letters Patent No. 249,487, dated November 15, 1881.

Application filed September 16, 1881. (No model.)

*To all whom it may concern:*

Be it known that I, EGBERT P. SHETTER, of Bullion, in the county of Venango and State of Pennsylvania, have invented certain new and useful Improvements in Means for Separating Water and Gas from Oil; and I do hereby declare the following to be a full, clear, and exact description of the invention, such as will enable others skilled in the art to which it pertains to make and use the same.

My invention relates to an improvement in means for separating water and gas from oil, the object of the same being to provide simple and efficient means whereby the water and gas are separated from the oil after the same has issued from the well and before it has been stored in the receiving-tanks; and with these ends in view, my invention consists in certain details in construction and combination of parts, as will be more fully explained, and pointed out in the claims.

In the accompanying drawings, Figure 1 represents a side elevation of my improved device in position near a well. Fig. 2 is a vertical sectional view of the chamber and intermediate connections, and Figs. 3, 4, 5, 6, and 7 represent modifications.

A represents a suitable tank of any desired size, shape, and construction, adapted to be set in the ground or on the surface thereof, as desired. This tank A is provided with the cover C', and is adapted to receive the water-tight well or chamber B, which latter is provided with an entrance-pipe, C, and three exit-pipes, E, D, and F, the former being for the entrance of the oil, water, and gas, and the latter for the exit of the gas, oil, and water respectively. The annular space O between the well or chamber B and the tank A is adapted to be filled with earth or steam to prevent the water from becoming frozen, and thereby clogging the well during cold weather. The pipe C leads directly from the oil-well, and in the present instance is provided with an opening, $d$, near the end communicating with the well or chamber B for the passage of the gas after the same has been separated from the oil and water. The outer end of this pipe C is screw-threaded, and is adapted to be secured to the well or chamber B above the line $x\ x$, indicating the surface of the oil. The well or chamber B is also provided with two partitions, G and H, the former being rigidly secured to the top of the chamber B, and extends in a vertical or inclined direction downward to a distance considerably below the line $x\ x$, while the partition H is connected to the sides of the chamber and extends up a distance above the line $x\ x$, while its lower end extends considerably below the center of the chamber B, thereby leaving a space between each end of the partition H and the top and bottom of the chamber. Near the bottom of the chamber B a connection is made, and a pipe, F, connected thereto for carrying off the water continuously or intermittently, as desired. The pipe or siphon used for the purpose, however, should not extend up to the line $x\ x$.

J is a plug secured in the bottom of the chamber B, and is adapted to be removed for the purpose of cleaning the chamber and removing all sediment. The pipe D, for carrying off the oil after the same has been separated from the gas, is situated near the upper end of the chamber, and leads directly to the storing-tank.

The operation of this device is as follows: As the oil, water, and gas issue from the oil-well they are conveyed through the pipe C to the chamber B. The oil in this chamber always stands up to the line $x\ x$, and by the extension of the partition G below the said line $x\ x$ an air-tight space, I, is formed, and all the gas entering this space ascends and passes out through the gas-pipe E, by which it can be conveyed to the furnace for use as a fuel, or used for lighting or any other of the numerous purposes to which petroleum-gas has been applied. After the gas has been separated from the water and oil the fluids pass downward around the partition H, and the oil, being lighter than water, will rise and pass out through the pipe D, while the water will remain at the bottom and pass out through the pipe F.

To guard against undue pressure on the well or chamber, and also to prevent any waste of oil should the chambers M and N become clogged from any cause whatever, I have left a space between the top of the chamber B and the top of the partition H through which the oil passes to the exit-pipe, thereby preventing it from backing up and passing out through the gas-pipe.

The top of the chamber B is provided with openings K, covered by the air-tight cap L, for the purpose of examining the interior of the chamber, and also for cleaning the same should it become clogged.

If my improved apparatus be placed on the derrick-floor, as shown in Fig. 1 of the drawings, the exhaust-steam, after being used to keep the stand-pipe warm, can be used in the box surrounding the chamber B, thereby keeping the lead-pipe from freezing, and delivering the oil in the receiving-tank in good condition for the pipe-lines to run without the usual trouble and expense attending the steaming of oil in winter.

In Fig. 3 I have represented the pipes connected to an ordinary wooden tank in their relative positions, this being a simple and inexpensive way of accomplishing the desired end. Fig. 4 represents a similar construction, with the position of the pipes slightly changed. In this case the gas-pipe E connects with the lead-pipe C at the joint $a$.

Fig. 5 represents the well or chamber B, (shown in Fig. 2 in a slightly modified form,) and instead of connecting the water-pipe thereto at the bottom, as shown in the said figure, it is introduced near the top and connects with a channel, $b$, formed in the side wall of the chamber B.

In Fig. 6 I have represented a separator made entirely of pipes and fittings, which is another cheap and inexpensive method of accomplishing the desired end; and Fig. 7 represents a downward extension or well, P', secured in any desired manner to the lower end of the separator in which the water-pipe or siphon F dips. This well P', being directly out of the current of the flowing oil and water, allows a thorough separation to take place therein, and the water, being heavier than the oil, sinks to the bottom and is carried off by the pipe F, which latter extends nearly to the bottom of the well.

In all of the above constructions the operations are precisely the same, the modifications, however, being less complicated in structure, and consequently cheaper to manufacture.

I would have it understood that I do not limit myself to any particular form or construction of apparatus for accomplishing the purposes in view, but consider myself at liberty to make such changes and alterations as fairly come within the spirit and scope of my invention.

I am aware that it is not new in oil-stills to conduct oil and superheated steam into a condensing-chamber and condense the greater portion of the combined oil and water by a jet of water, and to condense the lighter portions by a separate jet, and to draw off the oil and water through separate pipes located in different horizontal planes; and hence I would have it understood that I make no claim to such an apparatus. My invention is for a different purpose, and requires an apparatus of different construction. Instead of condensing the gas or volatile matter I separate and convey away the gas issuing with the crude oil from the well, and also separate the water from the oil.

Having fully described my invention, what I claim as new, and desire to secure by Letters Patent, is—

1. The combination, with a pipe communicating with an oil-well, said pipe having a downward extension or a chamber communicating therewith that extends downwardly, of a gas-escape pipe located at or nearly on a level with the discharge end of the supply-pipe, an oil-discharge pipe located below the gas-discharge pipe, and a water-discharge pipe located below the oil-pipe, substantially as set forth.

2. In an apparatus for separating oil from water and gas, the combination, with a conduit for discharging the oil, water, and gas from an oil-well, of a chamber or well adapted to receive the oil, water, and gas, and provided with two partitions, as described, for causing the water and oil to descend before passing from the chamber, a pipe for the exit of gas situated at the greatest elevation, a pipe for the exit of oil situated at the next elevation, and a pipe for the passage of water situated at the lowest elevation, substantially as set forth.

3. The combination, with the tank A, of the chamber or well B, provided with the conduit C, partitions G and H, gas-exit E, oil-exit D, and water-exit F, a plug, J, openings K, and air-tight cap L, substantially as set forth.

4. The combination, with the separator situated on the floor of the derrick and connected directly to the stand-pipe of the well and provided with a gas-exit at the highest elevation, an oil-exit at the next elevation, and a water-exit below the oil-exit, and means for separating the oil from the water and gas, of a surrounding-tank adapted, when desired, to contain steam or earth, substantially as set forth.

In testimony whereof I have signed this specification in the presence of two subscribing witnesses.

EGBERT P. SHETTER.

Witnesses:
S. L. SNYDER,
R. S. SANDERS.